United States Patent [19]

Gould

[11] 4,273,106
[45] Jun. 16, 1981

[54] COMPOSITE SYNTHETIC ROOFING STRUCTURE WITH INTEGRAL SOLAR COLLECTOR

[76] Inventor: Walter M. Gould, 1731 Harriman La., Redondo Beach, Calif. 90278

[21] Appl. No.: 961,328

[22] Filed: Nov. 16, 1978

[51] Int. Cl.³ .................... F24J 3/02; B29C 23/00; B22D 19/04
[52] U.S. Cl. ................................ 126/444; 126/449; 126/450; 126/DIG. 2; 264/46.4; 249/96; 428/160; 428/310; 52/309.7; 52/540
[58] Field of Search .............. 126/432, 442, 444, 449, 126/450, DIG. 2; 264/46.7, 46.4; 52/309.7, 560, 309.1, 540; 249/96; 428/160, 310

[56] References Cited

U.S. PATENT DOCUMENTS

| 4,010,733 | 3/1977 | Moore | 126/450 X |
| 4,028,450 | 6/1977 | Gould | 264/46.7 X |
| 4,056,092 | 11/1977 | Meier et al. | 126/432 X |
| 4,123,003 | 10/1978 | Winston | 126/435 X |
| 4,164,933 | 8/1979 | Alosi | 126/450 |
| 4,194,498 | 3/1980 | Mayerovitch | 126/450 |

FOREIGN PATENT DOCUMENTS

| 2309307 | 8/1974 | Fed. Rep. of Germany | |
| 2607740 | 9/1976 | Fed. Rep. of Germany | |
| 2621299 | 11/1976 | Fed. Rep. of Germany | 126/444 |
| 2529095 | 1/1977 | Fed. Rep. of Germany | 126/442 |
| 2602814 | 8/1977 | Fed. Rep. of Germany | 126/444 |
| 2735070 | 2/1978 | Fed. Rep. of Germany | 126/432 |
| 593461 | 4/1975 | Switzerland | 126/450 |

Primary Examiner—Samuel Scott
Assistant Examiner—Randall L. Green
Attorney, Agent, or Firm—David O'Reilly; Donald M. Cislo

[57] ABSTRACT

A form-molded synthetic foam roofing section or structure having a solar-collecting insert or panel incorporated therein with a relatively broad undersurface and an exposed surface configured to resemble interlocked and overlapping roofing shingles which are united to support a surface such as wood, metal, etc. during the molding process. The roofing structure may be affixed by any conventional means, such as nails or adhesives, to roof boards, rafters or over old existing roof structures with adjacent roofing sections interconnected by appropriate inlets and outlets for the solar panel insert. Solar heat-collecting fluid may be circulated through the solar panel inserts in a conventional manner. Connecting tubes are provided for connecting the solar panel inserts in adjacent roofing sections and terminal connectors are compatible with all circulating systems.

17 Claims, 15 Drawing Figures

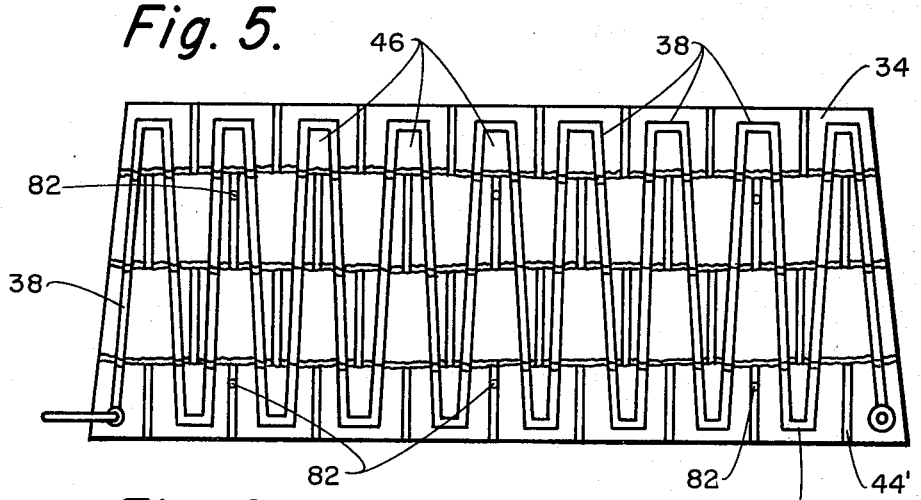
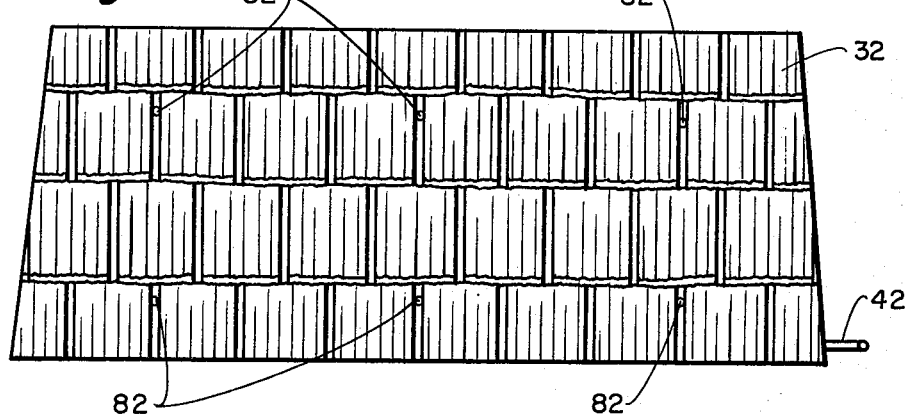
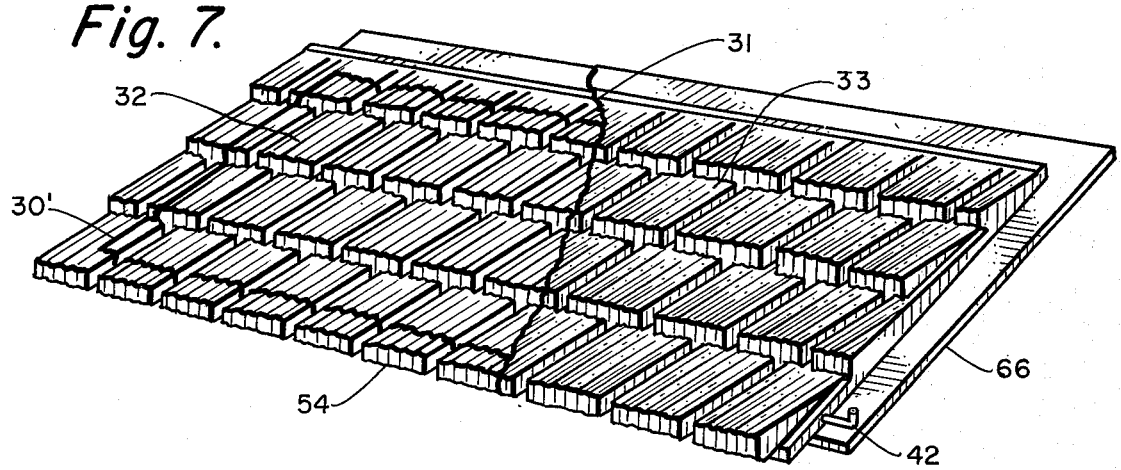

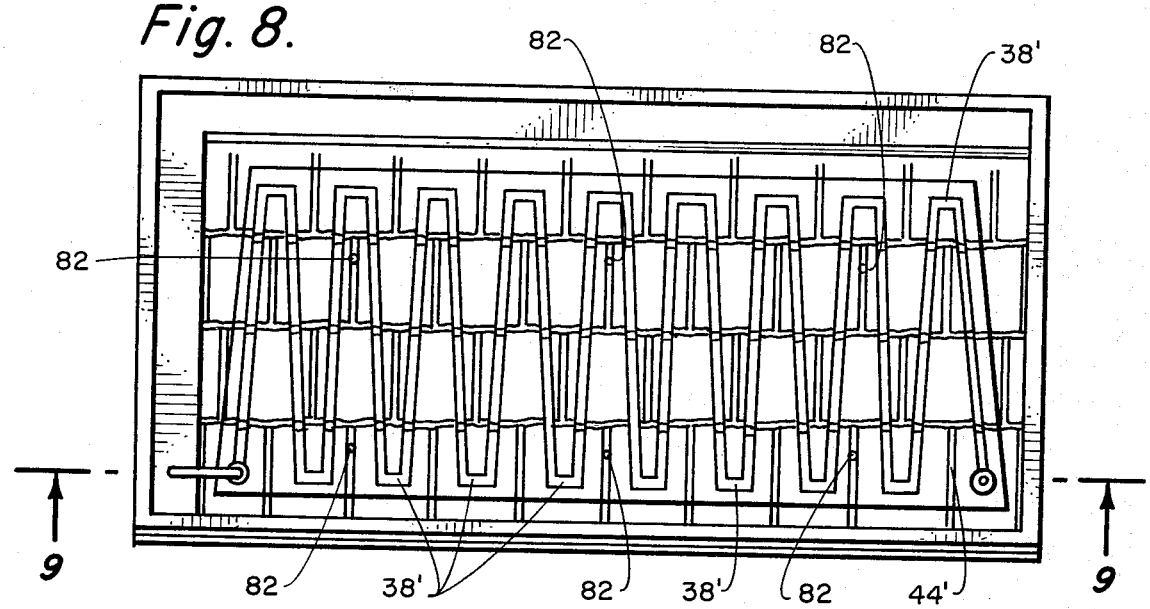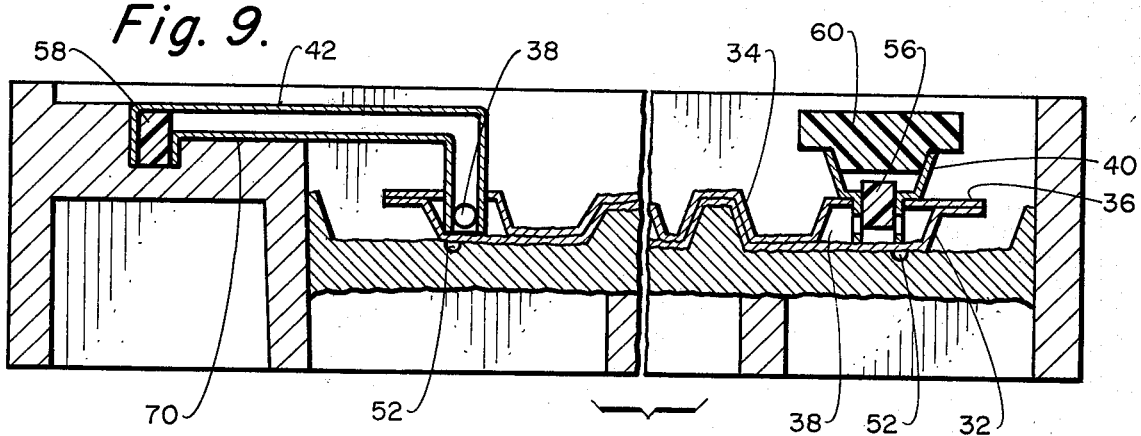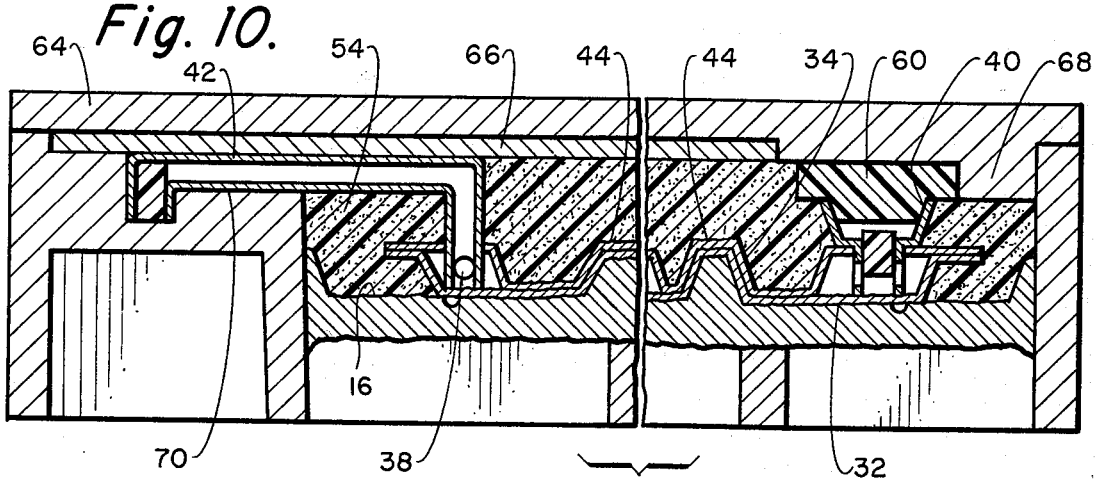

COMPOSITE SYNTHETIC ROOFING STRUCTURE WITH INTEGRAL SOLAR COLLECTOR

BACKGROUND OF THE INVENTION

This invention relates generally to roofing structures, and more particularly relates to structures for roof mountings which include solar heat collectors.

The need and activity in the solar heat-collecting field has increased greatly in recent years with many types of solar collectors being created. However, in most cases the solar heat-collecting devices are mostly directed to efficient collection of heat and do not generally emphasize appearance. For that reason, most of these solar heat-collecting devices are a distraction and detract from the general architectural appearance of buildings. In a few cases where new buildings are being constructed, the solar heat collectors have been incorporated in a manner to reduce the overall detraction from the aesthetic architectural effect, but this is of little aid to owners of older structures.

Additionally, synthetic foam molded roofing structures are relatively new and are advantageous for their ease of manufacturing and use. Such a molded synthetic composite roofing structure is illustrated in U.S. Pat. No. 4,028,450, of which the invention disclosed herein is an improved variation of the invention disclosed in that patent. The molded composite synthetic roofing structure disclosed in the above-identified patent is particularly advantageous because it can be made in relatively large sections and is simple and easy to install. It has the same general appearance as normal roofing shingles without the disadvantages of aging and deterioration as well as the fire hazards of wood shingles. It can be constructed to have the appearance of any type of roofing shingle, such as Spanish tile, wood shingle, or even composition shingles, if desired. The foam roofing structure by itself, however, is no more suitable for use with present solar heat-collecting devices than prior wood, composition, or Spanish tile-type shingles. The solar panel would have to still be mounted on the surface of the foam shingle and thus would detract from the beauty of the structure. For that reason the present invention seeks to avoid the disadvantages of attaching solar collectors to the external surface of the building, while at the same time permitting roofing replacements with the improved form-molded synthetic foam roofing.

SUMMARY OF THE INVENTION

The purpose of the present invention is to provide a new and novel roofing structure having an integral solar heat collector to permit roofing replacement utilizing solar heat collectors without detracting from the aesthetic value of the building.

The present invention contemplates a form-molded composite synthetic roofing structure, as disclosed in U.S. Pat. No. 4,028,450, the details of which are incorporated herein. With the molded composite synthetic foam roofing structure of the above patent, an integral substantially encapsulated solar panel insert is disclosed which can be molded into the foam in a manner which disguises the solar panel. This permits the synthetic foam roofing structures to be used as a replacement without detracting from the architectural appearance of the building. The solar panel insert is constructed of stamped metal with the exposed surface of the solar panel configured to resemble interlocked and overlapping roofing shingles identical with the shingles formed in the molding process. The solar panel insert can then be secured in the mold and formed (i.e. substantially encapsulated) right into the roofing structure. When the molded roofing structure is fully cured and removed, only the outline of the solar panel insert will be apparent. The exposed surface can then be covered with a UV proof coating to completely cover and hide the solar panel insert.

The solar panel insert is molded into the composite foam roofing structure with inlet and outlet pipes at each end so that the roofing structure can be installed in an overlapping relationship with adjacent panels interconnected for the circulation of a fluid for collecting solar energy. Installation or replacement of a roof with the form-molded composite synthetic roofing structure having the integral solar panel insert of the present invention will completely disguise or camouflage and hide the solar heat energy collecting system.

The roofing structure is constructed by first forming the solar panel insert of a corrosion-resistant material, for example, a plastic, copper, or stainless steel, with fluid channels formed in a bottom sheet. A top sheet is then formed of the same type of material and has an exposed surface configured to resemble interlock and overlapping roofing shingles matched to the interior surface of the mold for forming the roofing structure.

The top and bottom pieces are then seam welded around a peripheral flange and in the mating surfaces between the channels to completely seal the panel. Inlet and outlet tubes or pipes are then attached to the solar panel insert and normal leak tests are performed. The solar panel insert is then installed in the mold spaced from the walls, with the exposed surface of the solar panel insert matching and fitting into the bottom of the mold formed to resemble shingles. The solar panel is secured in the mold to prevent movement during the foaming process. One method of doing this is to provide a seal in the bottom of the mold to seal around the periphery of the solar panel insert and then provide vacuum lines to create pressure to force the solar panel against the interior surface of the cavity mold.

The mold is then filled with a foam and a pressure plate having a broad undersurface (preferably wood) base member attached and the mold securely closed for curing. As before, the mold should be chilled to a temperature (preferably 35° to 50° F.) sufficient to retard foam expansion for a period to provide a thick, almost impenetrable, tough skin on the foam. In order to strengthen the foam around the area of the solar panel insert, it may also be advantageous to chill the mold and the solar panel insert simultaneously.

After the foam has cured, the pressure plate is removed and the roofing structure released from the mold with the solar panel insert incorporated and almost fully encapsulated, except for the one surface in the foam roofing structure. The inlet and outlet pipes or tubes in the solar panel insert are plugged with a silicone or water-soluble plug during the molding process. The final step is the coating of the exposed surface or shingle configuration of the foam and solar panel insert structure to fully conceal the peripheral edge of the solar panel insert and provide an ultraviolet (UV) resistant coating. The roofing structure is now fully prepared for installation.

It is one object of the present invention to provide a roofing structure having an integral solar heat collector which will not detract from the architectural value of a building.

Another object of the present invention is to provide a roofing structure of a composite synthetic foam having an integral solar panel insert.

Yet another object of the present invention is to provide a roofing structure of a composite synthetic foam which has a concealed solar panel insert.

Other objects, advantages and novel features of the invention will become apparent from the following detailed description of the invention when considered in conjunction with the accompanying drawings wherein like reference numbers identify like parts throughout.

BRIEF DESCRIPTION OF THE DRAWINGS

FIG. 5 is a bottom view of the solar panel insert before installation into the mold.

FIG. 6 is a top elevation of the solar panel insert illustrating the configuration of the exposed surface to resemble interlocked and overlapping roofing shingles.

FIG. 7 is a perspective view of a completed synthetic foam roofing structure having a solar heat-collecting panel insert integrally encapsulated in the foam structure.

FIG. 8 is a top view of the mold with the solar panel insert installed before filling with synthetic foam.

FIG. 9 is a cross-sectional view of the solar panel insert installed in the mold taken at 6—6 of FIG. 5.

FIG. 10 is a cross-sectional view of the form mold with the solar panel installed similar to FIG. 6, with the mold filled with foam and the pressure plate attached.

DETAILED DESCRIPTION OF THE PREFERRED EMBODIMENT

Figure 1:
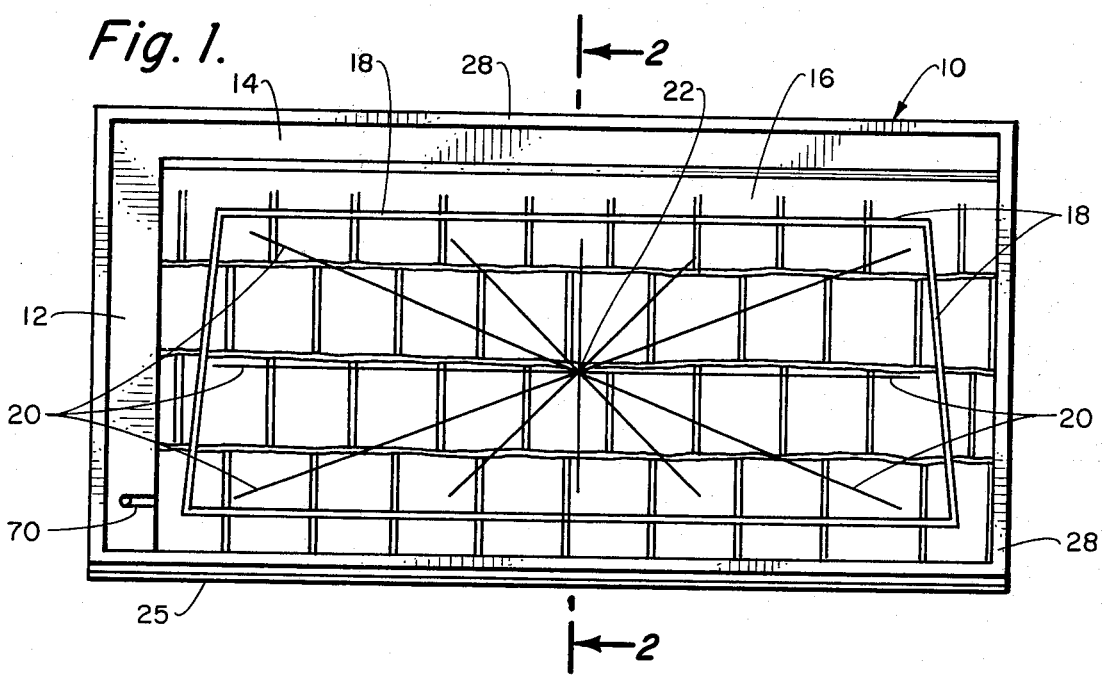
FIG. 1 is a top view of a mold suitable for producing the roofing structure of the invention disclosed herein.
Figure 2:
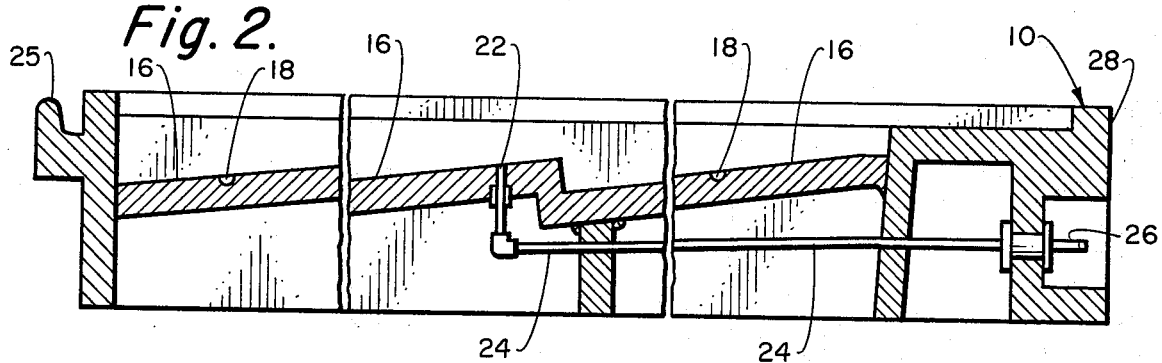
FIG. 2 is a sectional view of the mold of FIG. 1 taken at 2—2.
Figure 3:
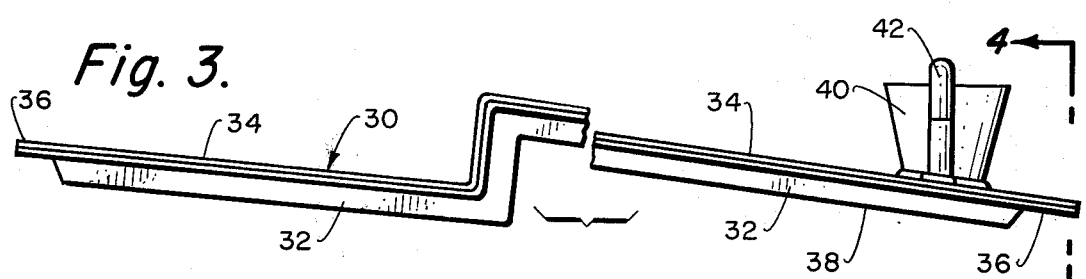
FIG. 3 is a side elevation of the solar panel insert for incorporation into the roofing structure of the invention.

The process and apparatus for creating the roofing structure of this invention is very similar to the apparatus for producing the synthetic foam roofing structure of U.S. Pat. No. 4,028,450, by the same inventor herein. However, the mold for manufacturing the synthetic foam roofing structure has been modified somewhat to accommodate and incorporate the solar heat-collecting panel insert. Referring now to FIG. 1, the mold 10 is shown as before, having the stepped edges 12 and 14 along one end and side as before. The interior surface of the mold 16 is configured to resemble interlocked and overlapping roofing shingles and can be of any suitable design as described in the patent referred to hereinabove. Thus the interior surface of the mold 16 will form the exposed surface of the completed roofing structure illustrated in FIG. 7 before a protective coating 33 is applied. However, in order to position the solar panel insert in the mold and secure it firmly in place, a groove or recess 18 is provided around the mold and is sized to be slightly smaller than the peripheral dimensions of the solar panel insert. This groove or recess 18 is for installation of an O-ring seal for sealing the surface of the solar panel insert to the interior surface 16 of the mold. The interior surface of the mold 16 also includes matching grooves 20 spreading out from a vacuum inlet hole 22 to which a vacuum line 24 (FIG. 2) is connected through quick-connect fitting 26. The fitting 26 is recessed in the wall 28 of the mold 10 to prevent damage during use. The fitting 26 would be a standard automatic shutoff connection (i.e. quick-connect) for drawing a vacuum in vacuum lines 20 etched in the surface of 16 of the mold 10.

The solar panel insert is made primarily of two sheets of corrosion-resistant material, such as a thin-gauge metal (for example, copper); however, other materials, such as plastic, could be used. Preferably the two sheets will be fabricated by drop-hammer dies, if of metal, or injection molding of plastic, both methods well known in the art. The surface 16 of the mold 10 would be used as a model to make the dies in order to assure that the stamped metal skins 32 and 34 of the solar panel insert 30 would match the interior surface 16 of the mold 10, as illustrated in FIGS. 8 through 10. That is, the entire surface of the upper sheet 32 of the solar panel insert conforms to the configuration of the interior surface 16 of the mold, including the undulations or ridges simulating the spaces between respective shingles.

The bottom sheet 34 of the solar panel insert 30 mates with the inner surface of upper sheet 32 that conforms to the interior surface of the mold, except in those portions where channels 38 are formed for circulating a heat-collecting fluid through the panel. The sheets are also formed to mate and provide a peripheral flange 36. Thus, the bottom sheet 34 mates with the top sheet in all areas, except where the channels 38 are formed. This can be seen more clearly in FIGS. 9 and 10, where the respective areas of the bottom and top sheets 32 and 34 intermesh or mate with the bottom surface of the mold 10 and with each other.

Figure 4:
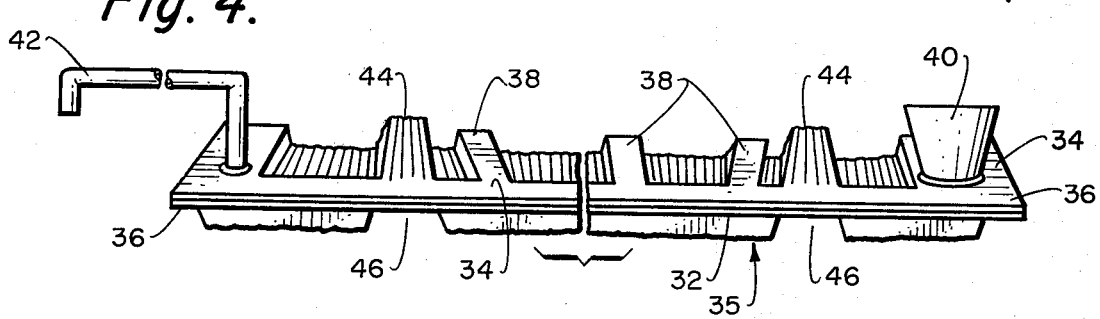
FIG. 4 is a front view of the solar panel insert taken at 4—4 of FIG. 3.

The solar panel insert is shown in FIGS. 4, 5 and 6, which are the front, bottom and top views respectively. The front view of FIG. 4 illustrates the inlet pipe or cone 40 and outlet pipe 42, which are secured to the solar panel at the respective ends of the continuous channel 38.

The front view of FIG. 4 illustrates the solar panel insert with the bottom side or sheet 34 up to illustrate the areaas where channels 38 are formed and the areas 44 where the top sheet 32 and bottom sheet 34 intermesh or mate. Thus, the spaces at 46 indicate areas simulating spaces between respective simulated shingles. To gain a more clear perspective, the space 44 and pair of channels 38 illustrated as nearest the inlet tube 40 in FIG. 4 are indicated as 44' and 38' in FIGS. 5 and 8. The bottom and top views of FIGS. 5 and 6 respectively illustrate the appearance of the solar panel insert before encapsulation in the foam of the synthetic foam roofing structure. The channels 38 are only visible from the bottom view, while the top view has the exposed surface area configured to resemble interlocked and overlapping roofing shingles. While a non-corrosive material for the two sheets 32 and 34 of the solar panel insert, such as a thin-gauge copper is preferred, other materials, such as plastic, could be used.

The completed roofing structure having the solar panel insert encapsulated is shown in FIG. 7. The solar panel insert is indicated by the dark line 30' in the left side of the view which illustrates the roofing structure prior to applying a finished ultraviolet (UV) proof coating. The right-hand side shows the roofing structure with the encapsulated solar heat-collecting insert completely hidden by a suitable protective coating, indicated by line 31. An elastomeric coating 33 is applied to provide the color and appearance of a wood shingle.

The fabrication of the roofing structure illustrated in FIG. 7 is shown in FIGS. 8 through 10. An O-ring seal 52 is installed in the groove 18 (FIG. 1) of the mold 10. The solar panel insert assembly 30 is then positioned in the mold 10 on the mold surface 16, as illustrated in FIGS. 8 and 9. The mold 10 is formed with a recess 70 (FIG. 1) to accommodate the inlet water pipe 42 during molding of the roofing structure. The O-ring 52 provides a seal around the periphery of the solar panel insert as shown in FIG. 9. A vacuum line is then connected to the quick-connect fitting 26 and a vacuum drawn beneath the solar panel insert 30 by means of the shallow vacuum grooves 20. The vacuum drawn forces the solar panel to the surface of the skin or sheet 32, tightly against the surface 16 of the mold 10, as shown in FIG. 9. Liquid foam 54 is then poured or sprayed into the mold over and around the solar panel insert 30 to completely surround the panel. Silicone plugs 56 and 58 prevent invasion of the foam 54 into the solar panel insert 30. A plug 60 to protect the inlet cone 40 is placed in the inlet cone 40 before foam 54 is poured into the mold.

The pressure plate 64 is placed over mold 10, closing the mold and securely holding plug 60 in place while the foam 54 cures. A wood base member 66 is secured to the pressure plate 64 in the manner described in the U.S. Pat. No. 4,028,450. The pressure plate assembly is securely held in place by clamps or some other suitable method, and the stepped area 68 will form a groove in the foam 54 adjacent to the inlet fluid tube 40 to accommodate the outlet fluid tube 42 when adjacent roofing structures are mated. The vacuum drawn beneath the solar panel insert will hold the surface skin tightly in place against the silicone O-ring 52, preventing the foam 54 from seeping under the solar insert while curing. This also prevents the solar insert from lifting off the surface 16 of the mold 10. After the foam 54 has cured, the vacuum in the channels 20 will be broken, allowing the pressure plate 64 and the encapsulated solar panel to be removed from the mold 10. The completed roofing structure with the encapsulated solar panel insert can then be removed from the pressure plate and stored until ready for use.

Figure 11:
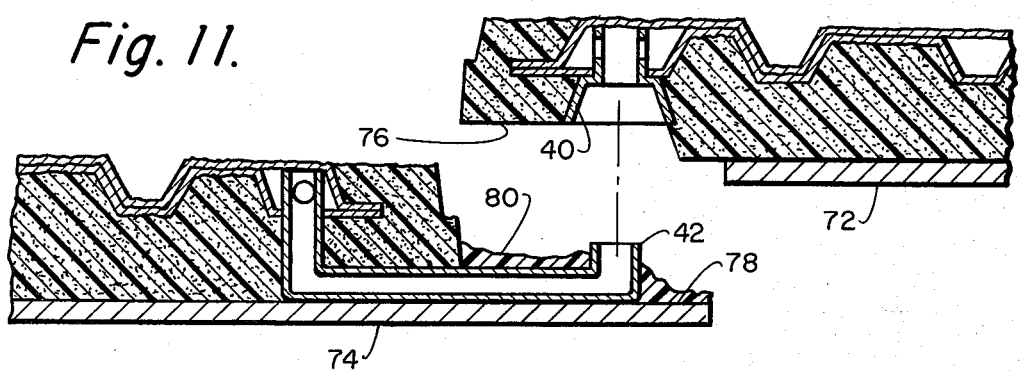
FIG. 11 is a partial cross-sectional view illustrating the installation of roofing structures with the ship-lap edges before completing the joint.
Figure 12:
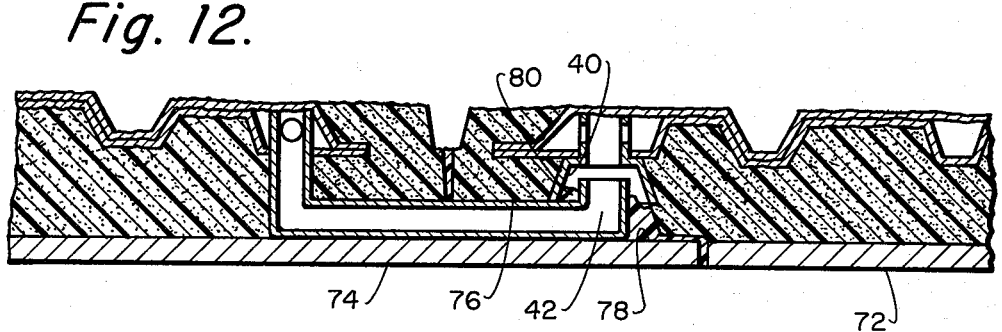
FIG. 12 is a partial cross-sectional view of two roofing structures according to the invention after the ship-lap edges and after the completion and sealing of the joint.

FIGS. 11 and 12 illustrate the manner of installing the roofing structures with the encapsulated solar panels. The roofing structure 72 will be positioned over a second roofing structure 74 so that the female edge 76 overlaps the male edge 78 with the inlet pipe 40 engaging or fitting over the outlet pipe 42 of the adjacent roofing structure 74. A sealant adhesive 80 is applied to ship-lap edge 78 of the roofing structure 74 around the outlet water tube 42. The silicone plugs 56 and 58 (if used) will then be removed before completion of the joint. Alternately, water-soluble plugs could be used to prevent sealant 80 from seeping into and potentially clogging the water circulation system. In order to prevent puncturing the circulation system during installation, nail holes 82 may be incorporated into the solar panel insert at the areas 44 where the top and bottom sheets 32 and 34 mate. This eliminates the necessity for searching for an area to nail through the roofing structure during installation. Nails for securing the synthetic foam roofing structure of the patent referred to above to a building are generally placed in the gaps between the simulated shingles in order to conceal the nails. Since the channels in the solar panel insert 30 are constructed and formed in the sheets to avoid the simulated spacing between respective shingles, nailing through the channels would ordinarily not occur accidentally, but the pre-incorporated nail holes 82 eliminate this possibility entirely.

Figure 13:
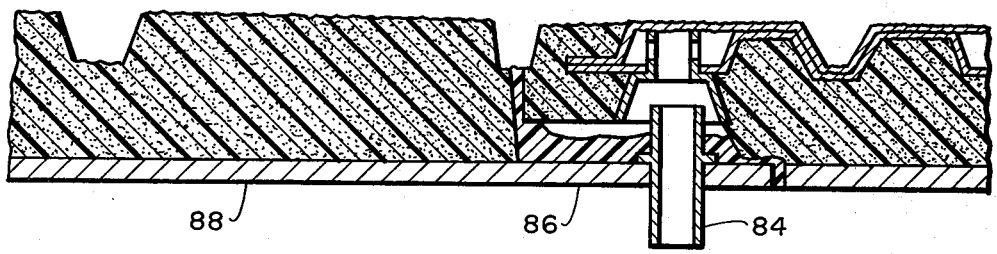
FIG. 13 is a partial cross-sectional view illustrating the joining of ship-lap edges of a standard synthetic foam roofing structure with a synthetic foam roofing structure incorporating the solar panel.
Figure 14:
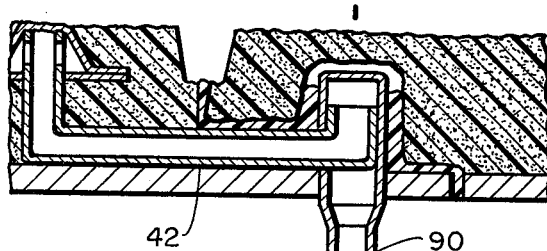
FIG. 14 is a partial cross-sectional view illustrating the connection of a standard synthetic foam roofing structure to the male end of the outlet of a synthetic foam roofing structure incorporating the solar panel insert.
Figure 15:
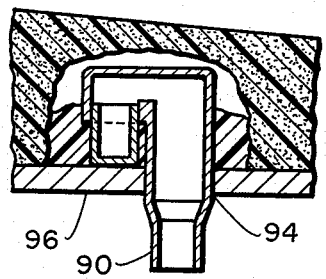
FIG. 15 is a partial cross-sectional view of the female terminal tube for connection to the outlet tube of the solar insert panel taken at 12—12 of FIG. 11.

Completion of the hookup of the fluid supply system, usually water, to the solar panel inserts is illustrated in FIGS. 13 through 15. The male tube 84 would be positioned in the ship-lap edge 86 of a standard synthetic foamed roofing structure 88, made according to the aforementioned patent. The outlet end of the completed solar heat collector would be connected by a female tube 90, fitted over the end of the outlet tube 42 of the last roofing structure forming the end panel of the solar heat-collecting system. The female fitting 90 would fit over the male tube 42 and pass through a hole 94 in the ship-lap edge 96 of the roofing structure. a standard roofing structure 98 would then fit over and completely conceal this outlet. Of course, many other types of connections could be made to terminate the inlet and outlet ends of the solar heat-collecting system formed by a plurality of roofing structures joined as illustrated in FIGS. 11 and 12. The male tube 84 and female tube 90 at opposite ends of the solar heat-collecting system would then be connected to an appropriate heat-collecting fluid and storage system for the solar heated water.

When completely installed, the solar heat-collecting system will be completely concealed within the roofing structure of a building and provide solar heat-collecting capability without detracting from the architectural beauty.

Obviously, many modifications and variations of the present invention are possible in light of the above teachings. It is therefore to be understood that the full scope of the invention is not limited to the details disclosed herein, but may be practiced otherwise than as specifically described.

What is claimed is:

1. A roofing structure incorporating a solar energy collecting device comprising:
   a base member;
   a form-molded foam shingle structure formed to simulate shingles, securely attached to said base member;
   one side and an adjacent end of the shingle structure overlapping an edge of said base member, and the other side and adjacent end of the base member overlapping the either side of the shingle structure;

a solar panel having a plurality of interconnected fluid channels embedded in said form-molded foam shingle structure with one surface of the solar panel being contiguous with the surface of the shingle structure; and said solar panel having an inlet and outlet communicating with said fluid channels at the overlapping edges of the base member and shingle structure whereby adjacently mounted roofing structures conceal the inlet and outlet pipes.

2. The roofing structure according to claim 1 wherein said solar panel comprises a pair of stamped metal sheets forming a plurality of interconnected water channels.

3. The roofing structure according to claim 2 wherein said solar panel is formed with a peripheral flange for anchoring the solar panel in the foam.

4. The roofing structure according to claim 2 wherein the solar panel has one surface formed to match the interior surface of a mold whereby the foam and solar panel contiguous surfaces appear continuous.

5. A method of making a solar heat-collecting roofing structure comprising:

forming a solar panel having a plurality of interconnected fluid channels and a collecting surface formed to have the appearance of shingles;

positioning said solar panel in a foam roofing shingle structure mold;

filling said mold with a foam to surround and embed said solar panel with the collecting surface contiguous with the surface of said foam roofing shingle structure.

6. The method according to claim 5 wherein the steps of forming said solar panel comprise:

stamping a first metal sheet with a surface to match the interior surface of a cavity mold and a peripheral flange;

stamping a second metal sheet with a predetermined number of fluid channels and surfaces matching predetermined surfaces of the first metal sheet, including a matching peripheral flange;

assembling the first and second metal sheets so that their mating surfaces and peripheral flanges mate; and welding the first and second metal sheets at the mating surfaces and peripheral flanges.

7. The method according to claim 6 including:

forming a first die from the interior surface of said mold for stamping said first metal sheet;

forming a second die having a plurality of channels from the interior surface of said mold for stamping said second metal sheet;

whereby the sheets having matching surfaces which, when assembled, matched the interior surface of said mold.

8. The method according to claim 5 comprising:

forming a mold having an internal stepped section about a portion of the periphery and a contoured interior surface simulating a shingle structure;

forming a solar panel having a plurality of fluid channels and a surface matching the contoured interior surface of said mold;

positioning said solar panel in said mold with the matching surfaces mating;

securing said solar panel in said mold;

filling said mold with a foamable thermosetting resin reaction mixture;

removably securing a reinforcing base member to a pressure plate;

securing said pressure plate in position on said mold with the base member fitting into the interior stepped section about the periphery of the mold;

permitting said reaction mixture to cure and unite with the base member and said solar panel;

releasing the solar panel after the reaction mixture has cured;

removing the pressure plate from the mold with the composite foamed roofing structure having the solar panel embedded therein attached; and removing the composite foam solar panel roofing structure from said pressure plate.

9. The method according to claim 8 including: chilling said mold before filling with the reaction mixture.

10. The method according to claim 9 wherein the step of chilling the mold is performed after securing the solar panel in said mold.

11. The method according to claim 8 wherein the mold is chilled to a temperature in the range of 35° to 50° F.

12. The method according to claim 8 wherein the steps of forming the solar panel comprise:

stamping a first metal sheet with a surface to match the interior surface of the mold and a peripheral flange;

stamping a second metal sheet with a predetermined number of fluid channels and surfaces matching predetermined surfaces of the first metal sheet including a matching peripheral flange;

assembling the first and second metal sheets so that their mating surfaces and peripheral flanges mate; and welding the first and second metal sheets at the mating surfaces and peripheral flanges.

13. The method according to claim 8 wherein the step of securing the solar panel in the mold comprises:

forming a plurality of vacuum grooves in the contoured interior surface of said mold;

forming a sealing groove around said vacuum grooves;

installing sealing means in said sealing groove;

positioning said solar panel insert over said sealing and vacuum grooves; and drawing a vacuum in said vacuum grooves to draw the surfaces of the solar panel insert and mold tightly together.

14. The method according to claim 5 wherein the step of positioning the solar panel in the mold comprises:

forming one surface of the solar panel insert to match the bottom surface of the mold whereby the solar panel insert is automatically positioned by mating the matching surfaces.

15. The method according to claim 14 wherein said step of forming one surface of the solar panel insert to match the bottom of the mold includes:

utilizing the bottom surface of the mold as a model to form a die;

forming said solar panel matching surface from said die.

16. The method according to claim 14 wherein the step of positioning the solar panel insert includes:

sealing the periphery of the solar panel insert to the bottom of the mold;

drawing a vacuum between the solar panel insert to hold the panel in place while the roofing structure is being formed whereby foam is prevented from covering one surface of the insert.

17. The method according to claim 5 wherein the step of positioning the solar panel insert includes:
   sealing the periphery of the solar panel insert to the bottom of the mold;
   drawing a vacuum between the solar panel insert to hold the panel in place while the roofing structure is being formed whereby foam is prevented from covering one surface of the insert.

* * * * *